(12) United States Patent
Dong

(10) Patent No.: US 12,429,035 B2
(45) Date of Patent: Sep. 30, 2025

(54) DEVICE FOR CLEANING AND MAINTAINING INTERIOR OF HUB IN WIND TURBINE NACELLE

(71) Applicant: Huaneng Fuxin Windy Power Generator Co., Ltd., Fuxin (CN)

(72) Inventor: Chenxi Dong, Shenyang (CN)

(73) Assignee: Huaneng Fuxin Windy Power Generator Co., Ltd., Fuxin (CN)

( * ) Notice: Subject to any disclaimer, the term of this patent is extended or adjusted under 35 U.S.C. 154(b) by 30 days.

(21) Appl. No.: 18/564,094

(22) PCT Filed: Mar. 23, 2022

(86) PCT No.: PCT/CN2022/082619
§ 371 (c)(1),
(2) Date: Nov. 26, 2023

(87) PCT Pub. No.: WO2023/029454
PCT Pub. Date: Mar. 9, 2023

(65) Prior Publication Data
US 2024/0247642 A1    Jul. 25, 2024

(30) Foreign Application Priority Data
Sep. 6, 2021   (CN) .......................... 202111038558.5

(51) Int. Cl.
*F03D 80/55*        (2016.01)
*B08B 3/02*         (2006.01)
(Continued)

(52) U.S. Cl.
CPC .............. *F03D 80/55* (2016.05); *B08B 3/028* (2013.01); *B08B 5/04* (2013.01); *F03D 80/70* (2016.05);
(Continued)

(58) Field of Classification Search
CPC ......... F03D 80/55; F03D 80/70; B08B 3/028; B08B 5/04; B08B 2203/0229; B08B 2230/01
See application file for complete search history.

(56) References Cited

U.S. PATENT DOCUMENTS

2019/0275566 A1*  9/2019  Ponomarev ............... B08B 5/04
2021/0052754 A1*  2/2021  Hilaire .................... B08B 3/028

FOREIGN PATENT DOCUMENTS

CN         105603620 A     5/2016
CN         208600291 U     3/2019
(Continued)

OTHER PUBLICATIONS

CN 2011071134 translation (Year: 2020).*
(Continued)

*Primary Examiner* — Michael E Barr
(74) *Attorney, Agent, or Firm* — Birchwood IP

(57) ABSTRACT

The invention provides a device for cleaning and maintaining the interior of a hub in a wind turbine nacelle, belonging to the technical field of wind power equipment. The device comprises a handle component, a switching assembly, a combined cleaning assembly and a maintenance assembly. The switching assembly is connected in a switching shaft block through a switching shaft. A high-temperature steam cleaning mechanism and a negative-pressure contaminant suction mechanism are arranged in the cleaning assembly to remove oil contaminants in the hub in the wind turbine nacelle. The device has a high level of integration, is easy to operate, and can improve the operation stability of a wind turbine.

9 Claims, 11 Drawing Sheets

(51) Int. Cl.
    *B08B 5/04*         (2006.01)
    *F03D 80/70*     (2016.01)

(52) U.S. Cl.
    CPC ... *B08B 2203/0229* (2013.01); *B08B 2230/01* (2013.01)

(56) References Cited

FOREIGN PATENT DOCUMENTS

| | | | |
|---|---|---|---|
| CN | 210195939 U | 3/2020 | |
| CN | 111452603 A | 7/2020 | |
| CN | 2011071134 | * 7/2020 | |
| CN | 111672649 A | 9/2020 | |
| CN | 113550875 A | 10/2021 | |
| CN | 214979673 U | 12/2021 | |
| JP | 2011041931 A | 3/2011 | |
| WO | WO-2011007443 A1 | * 1/2011 | ............. B08B 3/024 |

OTHER PUBLICATIONS

International search reports.
Written comments from the international search unit.
International publication of documents.

* cited by examiner

DEVICE FOR CLEANING AND MAINTAINING INTERIOR OF HUB IN WIND TURBINE NACELLE

BACKGROUND OF THE INVENTION

1. Technical Field

The invention relates to the technical field of wind power equipment, in particular to a device for cleaning and maintaining the interior of a hub in a wind turbine nacelle.

2. Description of Related Art

The increasing energy scarcity and environmental pollution faced by humanity have led to a growing recognition of the importance of wind power generation. China has abundant wind energy resources, with great potential for utilization. Therefore, the development of wind power generation is progressing rapidly, and the demand for maintenance is becoming increasingly urgent. Proper cleaning and maintenance of a wind turbine generator system are crucial to prolonging the lifespan and ensuring the stable operation of wind power equipment. Moreover, if not cleaned in a timely and thorough manner, oil contaminants that no longer provide lubrication can not only affect the normal operation of the equipment but also cause environmental pollution if leaked. Additionally, oil leakage and contamination in the wind turbine generator system pose considerable safety risks, as they may corrode components or cause fire hazards.

Traditional cleaning devices for wind turbine nacelles often only clean the dust inside a hub of the nacelle. For example, the prior art (CN 211071134 U) discloses an internal dust cleaning device for production of a wind turbine nacelle cover, which comprises a fixed base and two fixed plates; opposite outer walls of the two fixed plates are fixedly connected to the same connecting shaft, and an outer wall of the connecting shaft is sleeved with a fixed sleeve; an outer wall of the fixed sleeve is sleeved with a wind chamber pipe, and each port of the wind chamber pipe is fixedly connected to a dust suction nozzle; one side of one fixed plate is provided with a supporting plate on the outer wall, and a top outer wall of the supporting plate is provided with a dust collection box; one side of the other fixed plate is provided with a pull rod on the outer wall, and a top outer wall of the dust collection box is provided with an air pump; an intake end of the air pump is connected to the inside of the wind chamber pipe through a pipeline; and by arranging the wind chamber pipe and connecting a dust suction nozzle to each intake end of the wind chamber pipe, dust in different positions within the nacelle can be cleaned.

However, in practical operation, this simple device can only clean the dust scattered on the surface inside the hub of the nacelle and cannot remove oil contaminants that have stronger adhesion. Manual spraying of oil removal agents is required for oil contaminant removal. Additionally, after oil contaminants are removed, manual lubrication and maintenance of relevant transmission components are needed, which is time-consuming, labor-intensive, and inefficient.

BRIEF SUMMARY OF THE INVENTION

A device for cleaning and maintaining the interior of a hub in a wind turbine nacelle comprises an integrated handgrip, and further comprises a handle component and a switching assembly, wherein the handle component comprises a switching inner cavity and a switching shaft block, and the switching assembly comprises a switching body, a switching shaft, a switching center gear, a switching drive gear, a switching drive motor, a steam chamber, a contaminant collection chamber and an oil filling chamber;

the integrated handgrip in the handle component is a main structural body of the cleaning and maintenance device, the switching inner cavity runs through the integrated handgrip, the switching shaft block is arranged at a middle position of an outer side wall of a main front of the integrated handgrip, and the switching shaft is fixed at a middle position of an outer end face of the switching body in the switching assembly; the switching shaft is rotatably connected to the switching shaft block, and the switching body is located in the switching inner cavity; the switching center gear is fixedly inserted in a shaft end face of the switching shaft, and the switching drive gear meshes with one side of the switching center gear; the switching drive gear is connected with the switching drive motor by a shaft, and the switching drive motor is fixed on the outer side wall of the main front of the integrated handle;

the switching body is divided into three chambers, namely the steam chamber, the contaminant collection chamber and the oil filling chamber, and the three chambers are completely isolated;

the steam chamber and the contaminant collection chamber are provided with a combined cleaning assembly for high-temperature steam cleaning and negative-pressure contaminant suction; and a maintenance assembly for oiling maintenance is arranged in the oil filling chamber.

The handle component further comprises an operation port, a contaminant collection position and an operation handle, the operation port is formed at a front end of a main body of the integrated handgrip, a contaminant collection position is arranged at a middle position of an outer side wall of a main rear of the integrated handgrip, and front and rear surfaces of a rear end of the integrated handgrip are respectively provided with operation handles.

The switching assembly further comprises a steam outlet and a contaminant collection inlet, the steam outlet is formed at a position, communicating with the steam chamber, of a front end of an outer wall of the switching body, and the contaminant collection inlet is formed at a position, communicating with the contaminant collection chamber, of the front end of the outer wall of the switching body.

One end of a steam valve in the combined cleaning assembly for high-temperature steam cleaning and negative-pressure contaminant suction which is arranged in the steam chamber and the contaminant collection chamber is connected to a side, near the steam outlet, of an outer wall of a cavity of the switching body, the other end of the steam valve is connected with an atomizer, the other end of the atomizer is connected with a rapid heating pipe, the other end of the rapid heating pipe is connected with a water tank, and a water tank cover is installed at a top opening of the water tank; and a fan installation position is further arranged on the outer wall of the cavity of the switching body, the fan installation position is located behind the steam valve, a micro fan is inserted in the fan installation position, and an air inlet filter element is installed at an air inlet of the micro fan.

A steam cover is fixed on an outer end face of the steam chamber, and the steam cover is used for sealing the steam chamber; a contaminant collection cover is fixed on an outer end face of the contaminant collection chamber, and the contaminant collection cover is used for sealing the contaminant collection chamber; and a contaminant collection pump is connected to a main surface of the contaminant collection cover, and the other end of the contaminant collection pump is connected with a contaminant collection cylinder.

An oil filling pipe base in the maintenance assembly for oiling maintenance arranged in the oil filling chamber is arranged on a front end face of the oil filling chamber, an oil filling pipe is inserted into the oil filling pipe base, and a tail end of the oil filling pipe is connected to one side of a lower end of an oiler; a propulsion slide base is fixed to a bottom of the oiler, the propulsion slide base is connected in a propulsion screw in an adaptive manner, a front end of the propulsion screw is rotatably connected to a front screw base, a rear end of the propulsion screw is rotatably connected to a rear screw base, and the front screw base and the rear screw base are fixed on an inner wall of the oil filling chamber; an end shaft of the propulsion screw is connected with a screw motor, and the screw motor is fixed on the inner wall of the oil filling chamber;

an oiler slide base is fixed on an outer wall of the oiler, an upper wall of an inner cavity of the oil filling chamber is provided with an oiler slide position, and the oiler slide base is slidably connected in the oiler slide position;

a top of the oiler is provided with an oil filling cover, a middle position of a top of the oil filling cover is provided with an oil extrusion rack base, an oil extrusion rack is slidably connected in the oil extrusion rack base, a piston column is fixed at a lower end of the oil extrusion rack, and the piston column is located in an inner cavity of the oiler; and one side of the oil extrusion rack meshes with an oil extrusion gear, the oil extrusion gear is connected with an oil extrusion motor by a shaft, and the oil extrusion motor is fixed on the upper end face of the oil filling cover.

Further, two ends of a bottom surface of a main body of the switching body are respectively provided with auxiliary locking positions, and auxiliary ball positions corresponding to the auxiliary locking positions in position are arranged on the outer wall of the main front of the integrated handgrip; and an auxiliary ball locking position is fixed at a bottom end of the auxiliary ball position, a ball is slidably connected in the auxiliary ball position, a compression spring base is fixed at an upper end of the auxiliary ball position, and a compression spring is elastically connected between the ball and the compression spring base.

Further, a plurality of groups of gear locking positions are uniformly arranged on an outer main surface of the switching center gear centered on the switching shaft; a gear locking position base is fixed on the outer wall of the main front of the integrated handgrip, and a gear ball position is arranged on a side, near the switching center gear, of the gear locking position base; a gear ball locking position is fixed at a bottom end of the gear ball position, and the ball, the compression spring and the compression spring base are common parts; and another group of balls are slidably connected in the gear ball position, another group of compression spring bases are fixed at an upper end of the gear ball position, and another group of compression springs are elastically connected between another group of balls and the compression spring bases.

Further, an inner diameter of the auxiliary ball locking position is smaller than that of the auxiliary ball position, an inner diameter of the gear ball locking position is smaller than that of the gear ball position, a main body of the ball has the same dimension as the auxiliary ball locking position and the gear ball locking position, and a rear base of the ball has the same dimension as the auxiliary ball position and the gear ball position.

Further, a cleaning head is inserted in the operation port, a main body of the cleaning head is of an elastic telescopic structure which can be stretched back and forth and can also be bent up and down, left and right, a fixed end of the cleaning head communicates with both the steam outlet and the contaminant collection inlet, and a front end of the cleaning head is of a wide-mouth structure.

Compared with traditional cleaning devices for wind turbine nacelles, the device for cleaning and maintaining the interior of a hub in a wind turbine nacelle provided by the invention has the following advantages.

(1) The combined cleaning assembly for removing oil contaminants and the maintenance assembly are respectively arranged at two ends of the switching assembly. By starting the switching drive motor in the switching assembly, the switching drive gear is driven to engage with the switching center gear, causing the combined cleaning assembly and the maintenance assembly located at the two ends of the switching assembly to move to the operation port in the handle component, enabling the conversion of oil contaminant cleaning and oiling. The switching center gear and the switching body are provided with the gear locking position and the auxiliary locking position respectively, and when the combined cleaning assembly and the maintenance assembly move to proper positions, the ball will be locked in the gear locking position and the auxiliary locking position under the pressure of the compression spring, ensuring the precise switching of the combined cleaning assembly and the maintenance assembly.

(2) By arranging the high-temperature cleaning mechanism in the steam chamber of the switching assembly, high-temperature steam generated can effectively remove oil contaminants adhering to mechanisms in a hub in a wind turbine nacelle under the driving of the micro fan. By starting the contaminant collection pump in the contaminant collection chamber, a vacuum is formed, so that oil contaminants detached from the mechanisms in a hub in a wind turbine nacelle can be sucked into the contaminant collection cylinder, facilitating the removal of oil contaminants.

(3) The operation port in the handle component is connected with the cleaning head. The front end of the cleaning head is of a wide-mouth structure, and the body of the cleaning head is of a flexible structure that can be extended and bent. The steam chamber and the contaminant collection chamber in the combined cleaning assembly can synchronously communicate with the cleaning head, facilitating the suction of contaminants after steam cleaning.

(4) After oil contaminants adhering to mechanisms in a hub in a wind turbine nacelle are removed, the screw motor in the maintenance assembly of the oil filling chamber can be started to drive the oiler and the oil filling pipe to move towards the front end, allowing the oil filling pipe to extend out of the cleaning head. By starting the oil extrusion motor, the oil extrusion gear is driven to engage with the oil extrusion rack, driving the piston column to extrude lubricating oil in the oiler. The lubricating oil is then applied to the surfaces of mechanisms in a hub in a wind turbine nacelle through the oil filling pipe to complete the maintenance work, achieving multiple functions and a high level of integration.

BRIEF DESCRIPTION OF THE SEVERAL VIEWS OF THE DRAWINGS

In order to more clearly explain the embodiments of the invention or the technical scheme in the prior art, the following will briefly introduce the drawings needed in the description of the embodiments or the prior art. Obviously, the drawings in the following description are only some embodiments of the invention. For those of ordinary skill in the art, other drawings can be obtained according to the provided drawings without paying creative labor.

Figure 1:
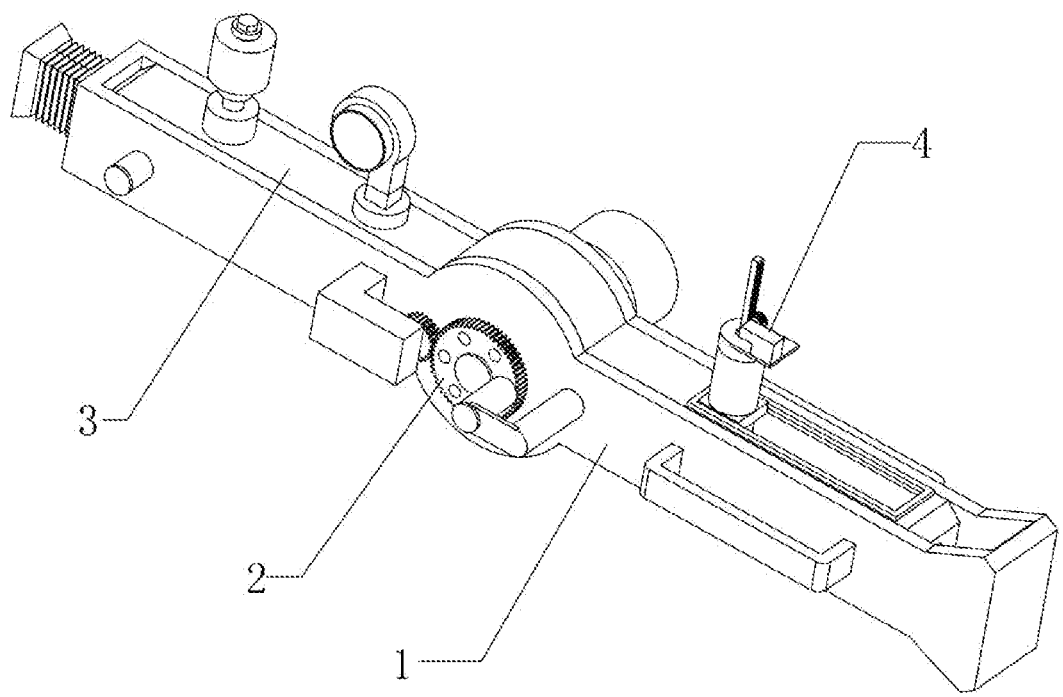
FIG. 1 is a diagram of an overall structure of a device for cleaning and maintaining the interior of a hub in a wind turbine nacelle provided by the invention.

Reference numerals: 1. handle component; 2. switching assembly; 3. combined cleaning assembly; 4. maintenance assembly; 101. integrated handgrip; 102. switching inner cavity; 103. switching shaft block; 104. operation port; 105. contaminant collection position; 106. operation handle; 201. switching body; 202. switching shaft; 203. switching center gear; 204. switching drive gear; 205. switching drive motor; 206. auxiliary locking position; 207. auxiliary ball position; 208. auxiliary ball locking position; 209. ball; 210. compression spring; 211. compression spring base; 212. gear locking position; 213. gear locking position base; 214. gear ball position; 215. gear ball locking position; 216. steam chamber; 217. contaminant collection chamber; 218. oil filling chamber; 219. steam outlet; 220. contaminant collection inlet; 301. steam valve; 302. atomizer; 303. rapid heating pipe; 304. water tank; 305. water tank cover; 306. fan installation position; 307. micro fan; 308. air inlet filter element; 309. steam cover; 310. contaminant collection cover; 311. contaminant collection pump; 312. contaminant collection cylinder; 313. cleaning head; 401. oil filling pipe base; 402. oil filling pipe; 403. oiler; 404. propulsion slide base; 405. propulsion screw; 406. front screw base; 407. rear screw base; 408. screw motor; 409. oiler slide position; 410. oiler slide base; 411. oil filling cover; 412. oil extrusion rack base; 413. oil extrusion rack; 414. oil extrusion gear; 415. oil extrusion motor; 416. piston column.

DETAILED DESCRIPTION OF THE INVENTION

In order to make the purpose, technical scheme and advantages of the embodiments of the invention more clear, the technical scheme in the embodiments of the invention will be clearly and completely described below in combination with attached drawings. Obviously, the described embodiments are only part of the embodiments of the invention, not all of them. Based on the embodiments of the invention, all other embodiments obtained by those of ordinary skill in the art without making creative labor shall belong to the scope of protection of the invention.

In the description of the invention, it should be noted that directional or positional relationships indicated by the terms such as "center", "longitudinal", "transverse", "upper", "lower", "front", "rear", "left", "right", "vertical", "horizontal", "top", "bottom", "inner", and "outer" are based on the directional or positional relationships shown in the drawings, which are only for the convenience of describing the invention and simplifying the description, but do not indicate or imply that the referred devices or elements must have a specific orientation or be constructed and operated in a specific orientation, so they cannot be understood as limiting the invention. In addition, the terms "first" and "second" are only used for descriptive purposes and cannot be understood as indicating or implying relative importance.

The following is an exemplified description of a device for cleaning and maintaining the interior of a hub in a wind turbine nacelle provided by the invention, with reference to the accompanying drawings.

Embodiment I

Figure 2:
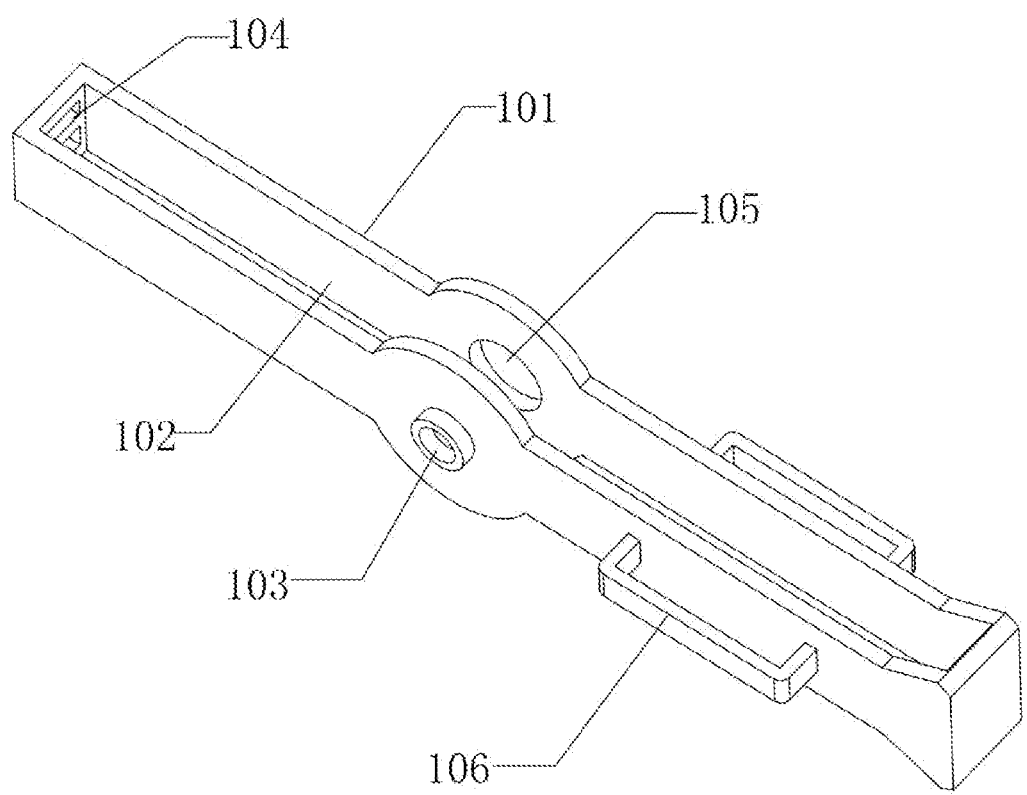
FIG. 2 is a structural diagram of a handle component of the invention.
Figure 3:
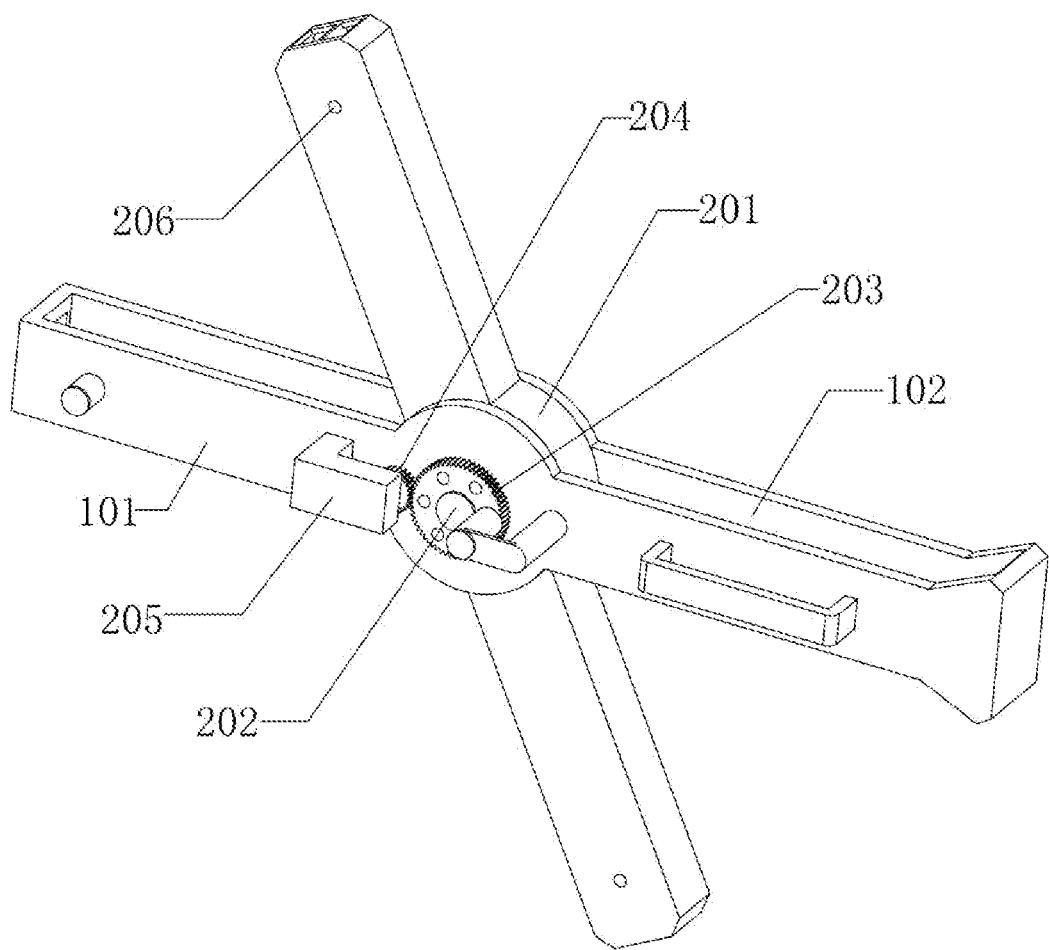
FIG. 3 is a structural diagram of a switching assembly of the invention.
Figure 4:
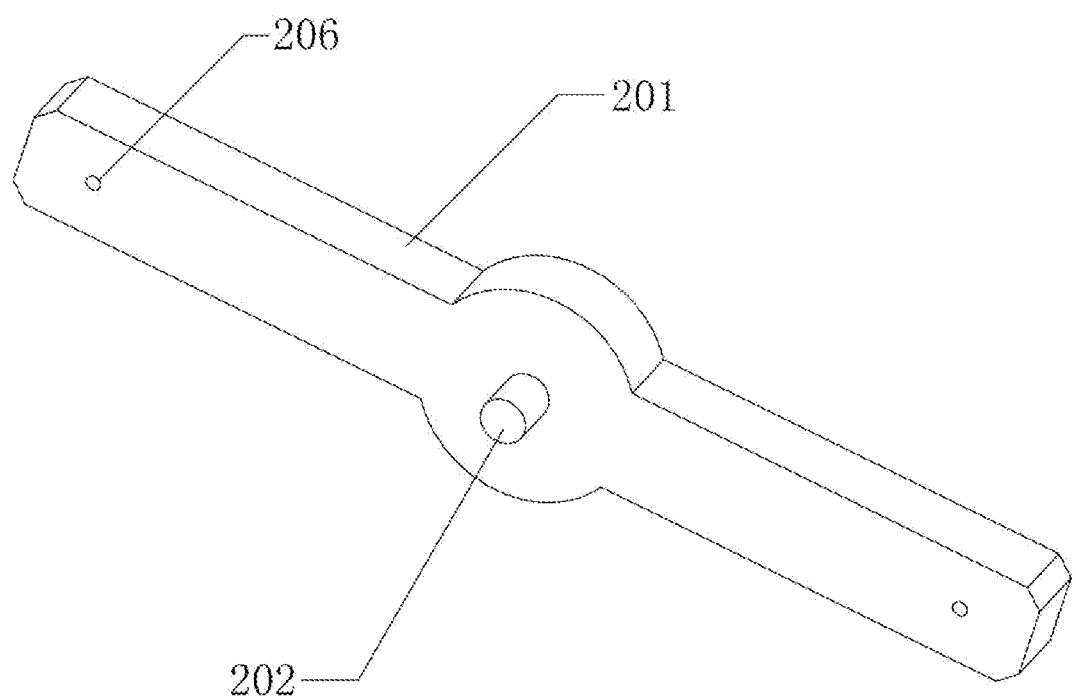
FIG. 4 is a structural diagram of a switching body in a switching assembly of the invention.
Figure 5:
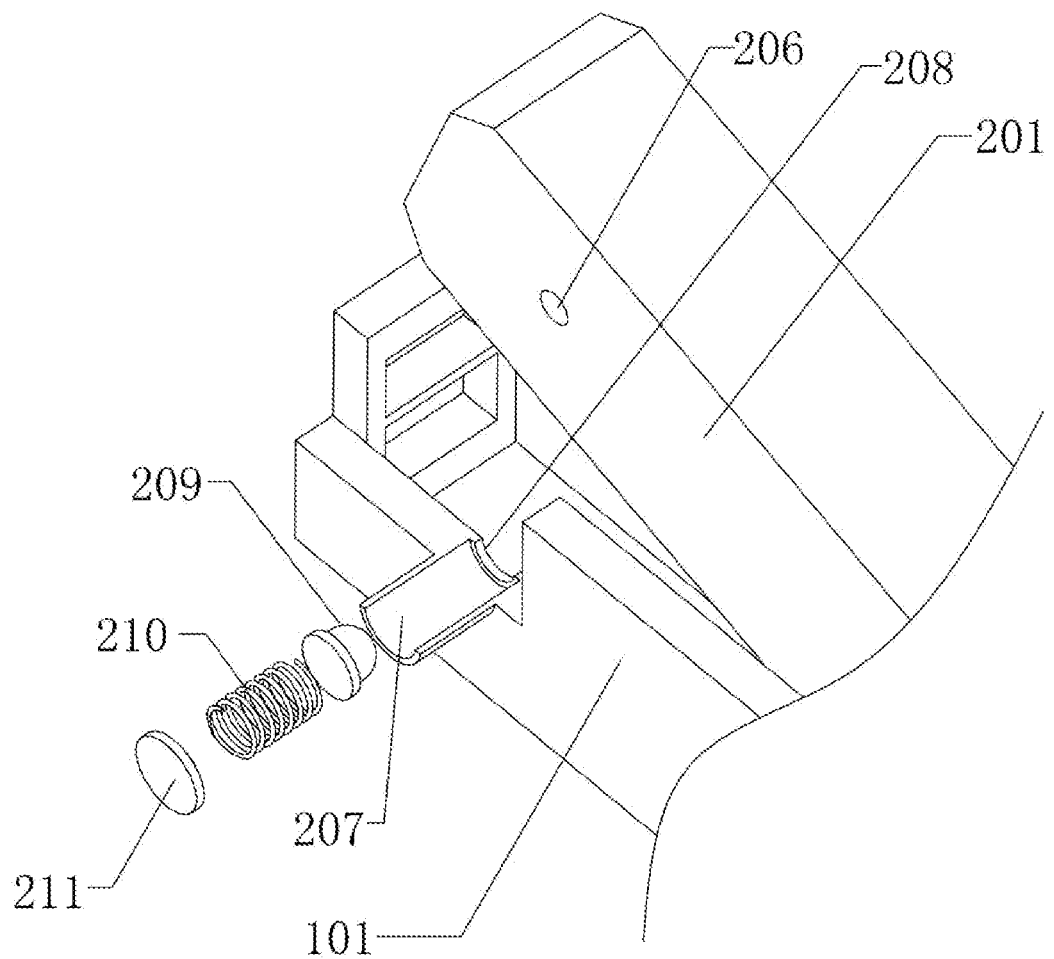
FIG. 5 is a structural diagram of an auxiliary ball position in a switching assembly of the invention.
Figure 6:
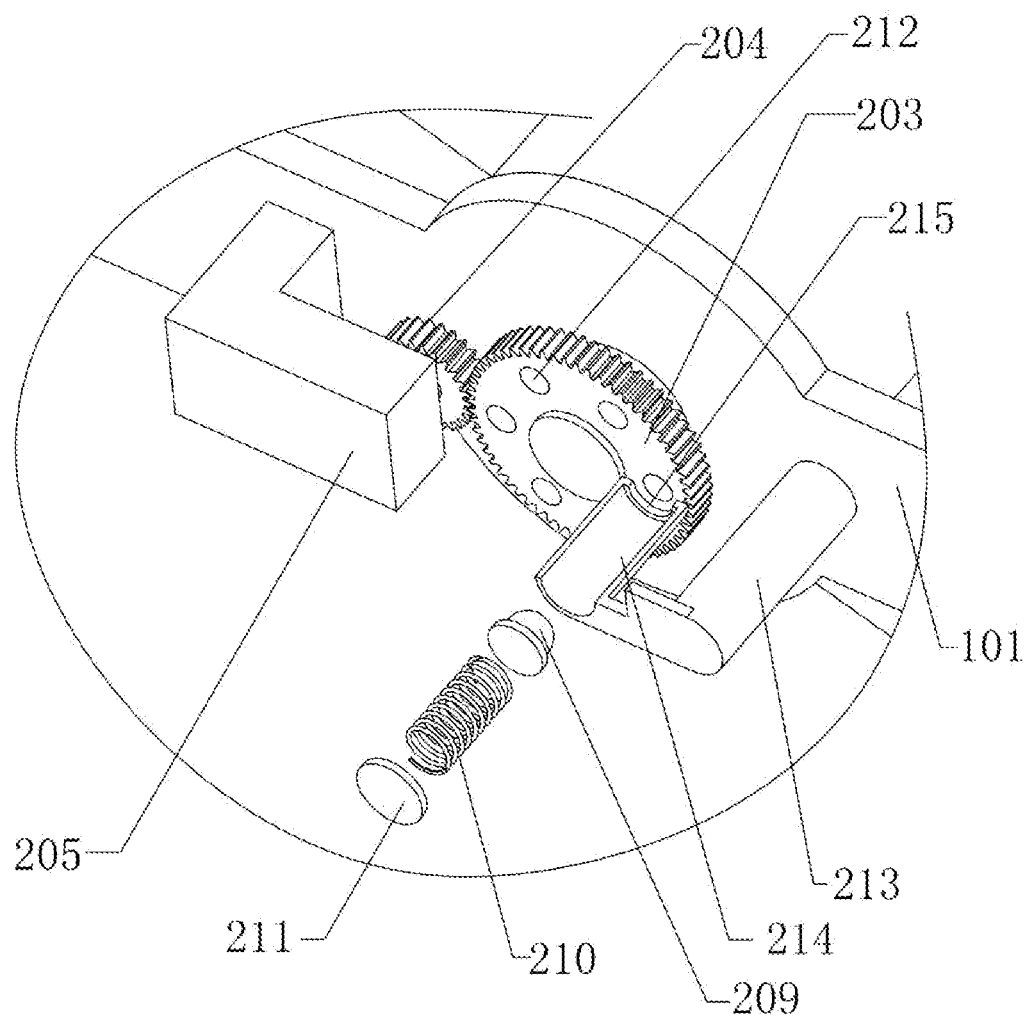
FIG. 6 is a structural diagram of a gear ball position in a switching assembly of the invention.
Figure 7:
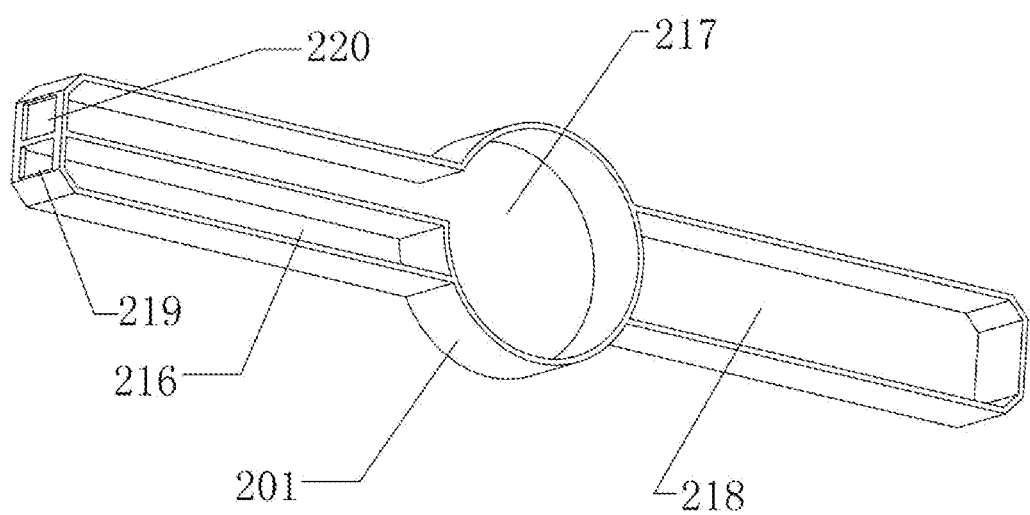
FIG. 7 is a structural diagram of a steam chamber in a switching assembly of the invention.
Figure 8:
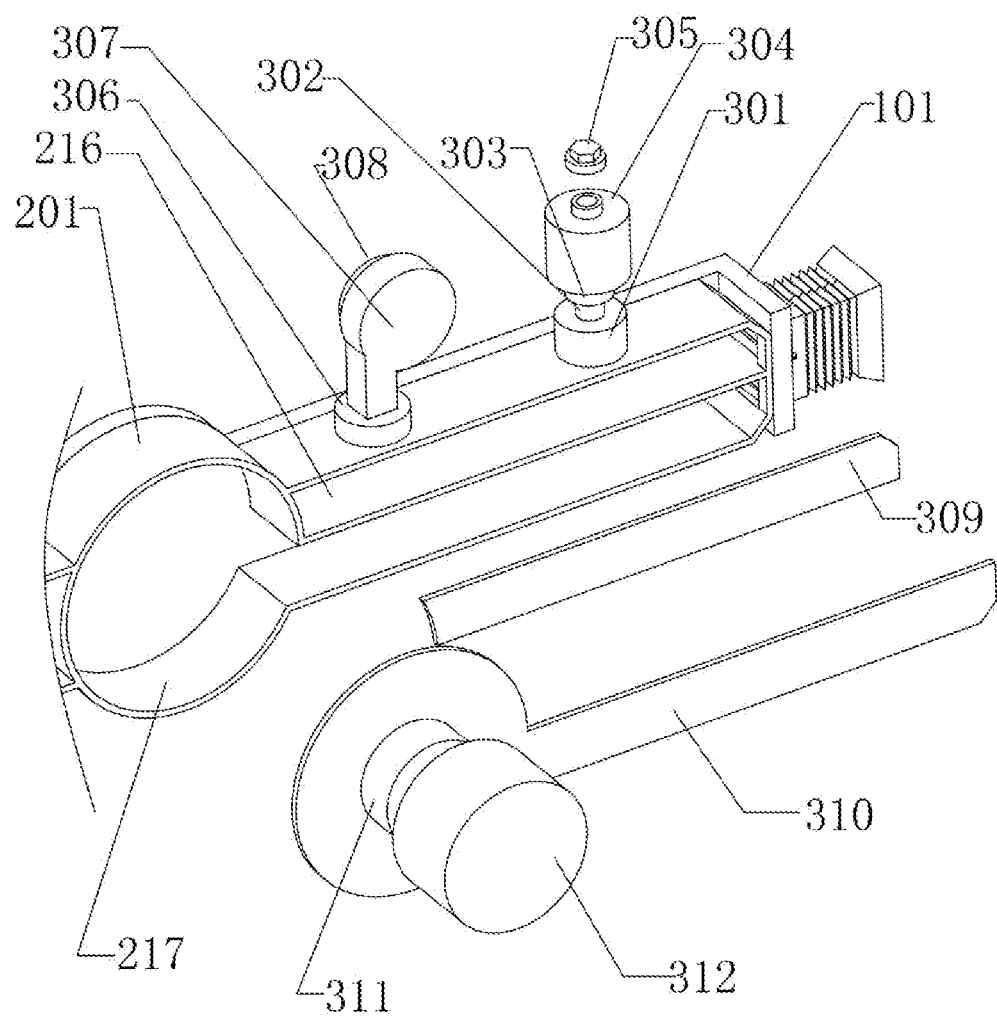
FIG. 8 is a structural diagram of a combined cleaning assembly of the invention from a first perspective.
Figure 9:
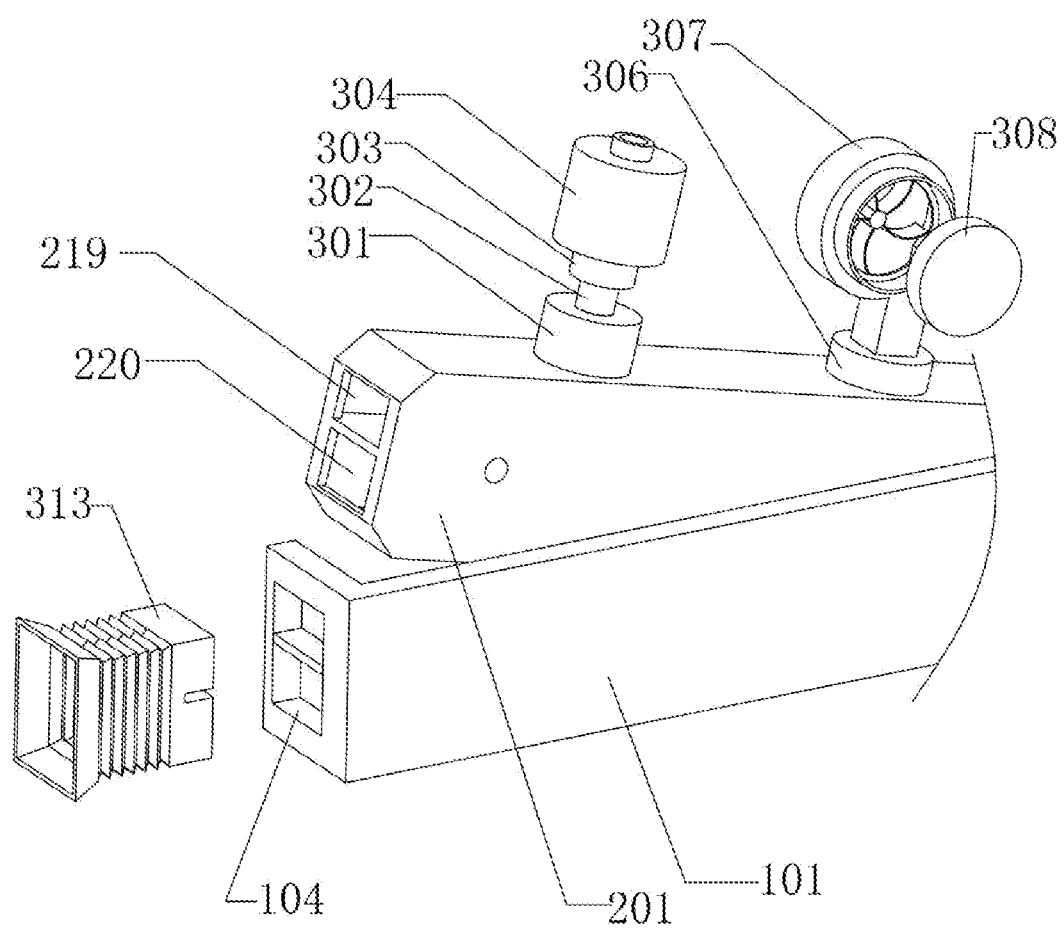
FIG. 9 is a structural diagram of a combined cleaning assembly of the invention from a second perspective.

Examples of cleaning transmission mechanisms in a hub in a wind turbine nacelle according to the invention are shown in FIGS. 1, 2, 3, 4, 5, 6, 7, 8 and 9. An integrated handgrip 101 in a handle component 1 is a main structural body of a cleaning and maintenance device, a switching inner cavity 102 runs through the integrated handgrip 101, a switching shaft block 103 is arranged at a middle position of an outer side wall of a main front of the integrated handgrip 101, and a switching shaft 202 is fixed at a middle position of an outer end face of a switching body 201 in a switching assembly 2; the switching shaft 202 is rotatably connected to the switching shaft block 103, and the switching body 201 is located in the switching inner cavity 102; a switching center gear 203 is fixedly inserted in a shaft end face of the switching shaft 202, and a switching drive gear 204 meshes with one side of the switching center gear 203; the switching drive gear 204 is connected with a switching drive motor 205 by a shaft, and the switching drive motor 205 is fixed on the outer side wall of the main front of the integrated handle 101.

The switching body 201 is divided into three chambers, namely a steam chamber 216, a contaminant collection chamber 217 and an oil filling chamber 218, the three chambers are completely isolated, the steam chamber 216 and the contaminant collection chamber 217 are provided with a combined cleaning assembly 3 for high-temperature steam cleaning and negative-pressure contaminant suction, and a maintenance assembly 4 for oiling maintenance is arranged in the oil filling chamber 218.

By starting the switching drive motor 205, the switching drive gear 204 is driven to engage with the switching center gear 203, so that the combined cleaning assembly 3 and the maintenance assembly 4 on the switching body 201 can be driven to rotate to the operation port 104.

Preferably, two ends of a bottom surface of a main body of the switching body 201 are respectively provided with auxiliary locking positions 206, and auxiliary ball positions 207 corresponding to the auxiliary locking positions 206 in position are arranged on the outer wall of the main front of the integrated handgrip 101; an auxiliary ball locking position 208 is fixed at a bottom end of the auxiliary ball position 207, a ball 209 is slidably connected in the auxiliary ball position 207, a compression spring base 211 is fixed at an upper end of the auxiliary ball position 207, and a compression spring 210 is elastically connected between the ball 209 and the compression spring base 211; in this way, after the steam chamber 216, the contaminant collection chamber 217 and the oil filling chamber 218 at two ends of the main body of the switching body 201 rotate into position, the ball 209 is just locked in the auxiliary locking position 206 under the elastic pressure of the compression spring 210.

Preferably, a plurality of groups of gear locking positions 212 are uniformly arranged on an outer main surface of the switching center gear 203 centered on the switching shaft 202; a gear locking position base 213 is fixed on the outer wall of the main front of the integrated handgrip 101, and a gear ball position 214 is arranged on a side, near the switching center gear 203, of the gear locking position base 213; a gear ball locking position 215 is fixed at a bottom end of the gear ball position 214, and the ball 209, the compression spring 210 and the compression spring base 211 are common parts; another group of balls 209 are slidably connected in the gear ball position 214, another group of compression spring bases 211 are fixed at an upper end of the gear ball position 214, and another group of compression springs 210 are elastically connected between another group of balls 209 and the compression spring bases 211; in this way, the switching center gear 203 is able to rotate at a fixed position, and when another group of balls 209 are locked in one group of gear locking positions 212, the balls 209 located at two ends of the main body of the switching body 201 are precisely locked into the auxiliary locking positions 206, achieving dual-locking of the steam chamber 216, the contaminant collection chamber 217, and the oil filling chamber 218 at the two ends of the main body of the switching body 201 after rotating into position, thus enhancing operational accuracy.

One end of a steam valve 301 in the combined cleaning assembly 3 is connected to a side, near the steam outlet 219, of an outer wall of a cavity of the switching body 201, the other end of the steam valve 301 is connected with an atomizer 302, the other end of the atomizer 302 is connected with a rapid heating pipe 303, the other end of the rapid heating pipe 303 is connected with a water tank 304, and a water tank cover 305 is installed at a top opening of the water tank 304. After injecting pure water into the water tank 304, the pure water is subjected to one-pass heating through the rapid heating pipe 303 and then atomized by the atomizer 302 to form high-temperature steam. Upon opening the steam valve 301, the high-temperature steam will enter the steam chamber 216.

A fan installation position 306 is further arranged on the outer wall of the cavity of the switching body 201, the fan installation position 306 is located behind the steam valve 301, a micro fan 307 is inserted in the fan installation position 306, and an air inlet filter element 308 is installed at an air inlet of the micro fan 307. After the micro-fan 307 is started, outside air enters the steam chamber 216 after being filtered through the air inlet filter element 308. The high-temperature steam generated in the steam chamber 216 can be driven to move to the steam outlet 219, and the steam outlet 219 communicates with the cleaning head 313. By placing the cleaning head 313 against the surfaces of transmission mechanisms in a hub in a wind turbine nacelle, the high-temperature steam comes into contact with the transmission mechanisms in a hub in a wind turbine nacelle, causing oil contaminants to be detached from the surfaces of the transmission mechanisms. Then by starting the contaminant collection pump 311, a vacuum is generated in the contaminant collection chamber 217 which communicates with the cleaning head 313 through the contaminant collection inlet 220, so that oil contaminants detached from the surfaces of the transmission mechanisms can be sucked into the contaminant collection cylinder 312, facilitating the removal of oil contaminants adhering to the transmission mechanisms.

Embodiment II

Figure 10:
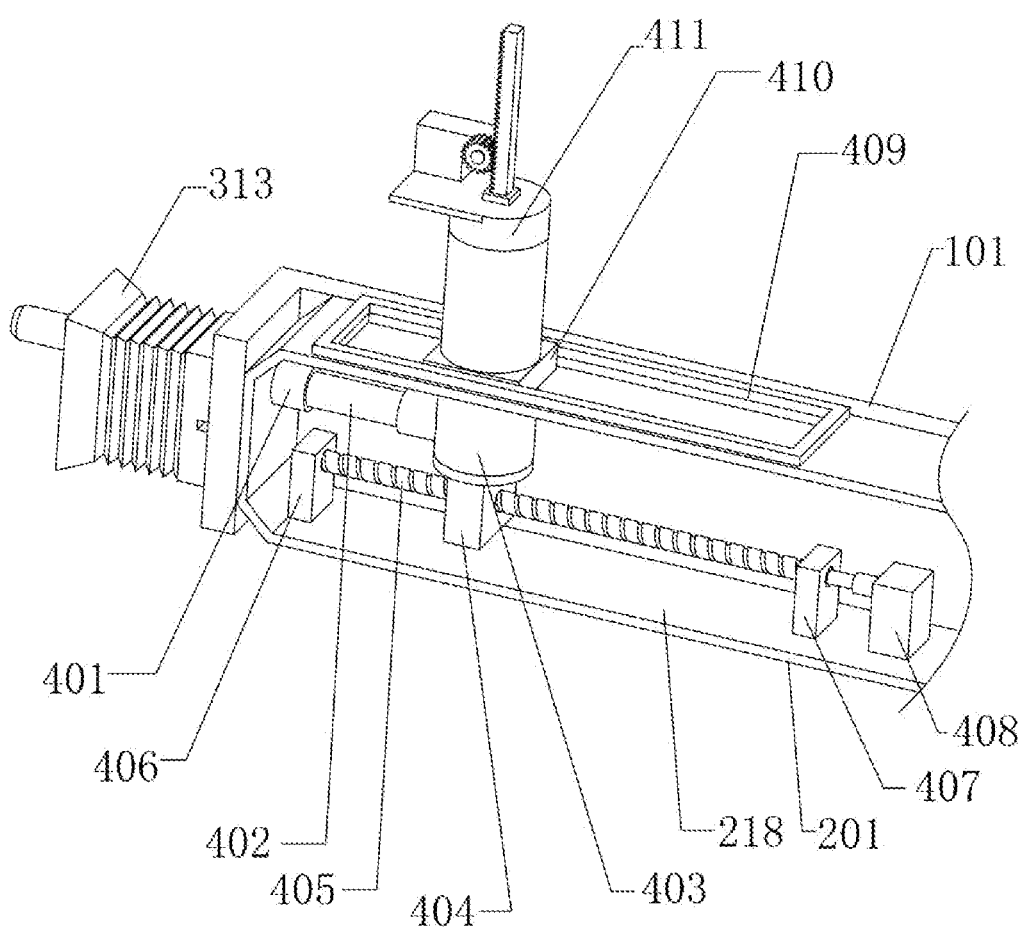
FIG. 10 is a structural diagram of a maintenance assembly of the invention.
Figure 11:
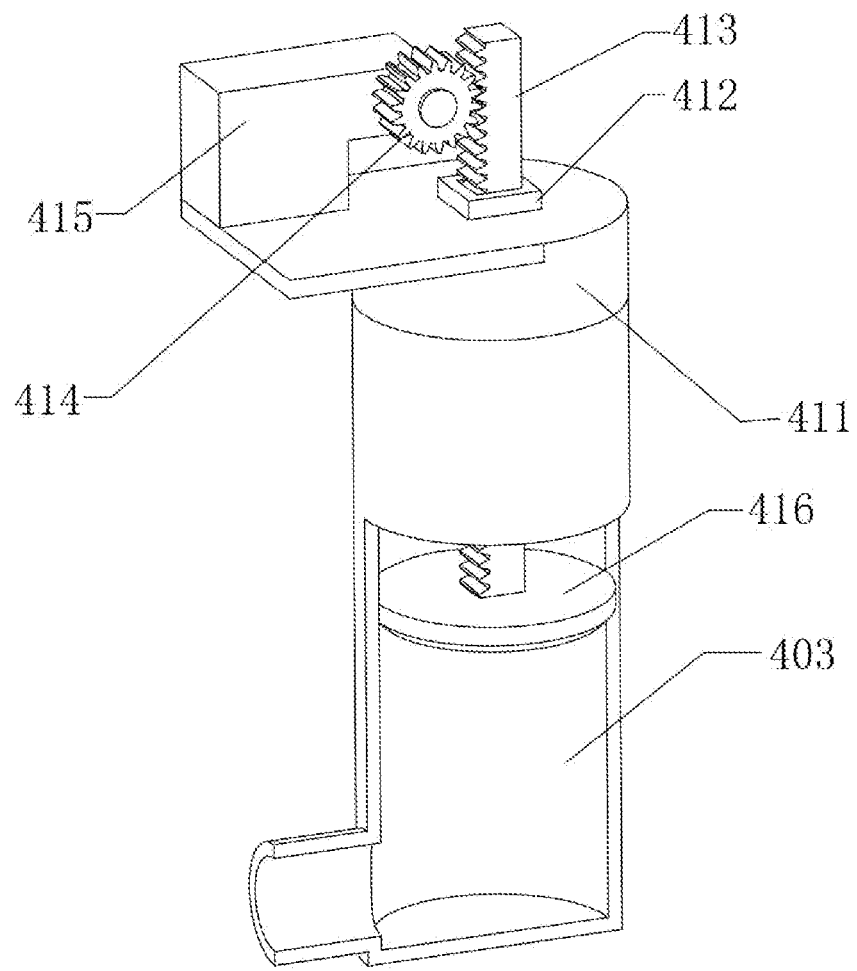
FIG. 11 is a structural diagram of an oiler in a maintenance assembly of the invention.

Examples of maintenance after cleaning transmission mechanisms in a hub in a wind turbine nacelle according to the invention are shown in FIGS. 1, 2, 3, 4, 5, 6, 10 and 11. After removing oil contaminants adhering to the transmission mechanisms in a hub in a wind turbine nacelle, the switching drive motor 205 is started again, the switching drive gear 204 is driven to engage with the switching center gear 203, so that the maintenance assembly 4 on the switching body 201 can be driven to rotate to the operation port 104.

An oil filling pipe base 401 in the maintenance assembly 4 is arranged on a front end face of the oil filling chamber 218, an oil filling pipe 402 is inserted into the oil filling pipe base 401, and a tail end of the oil filling pipe 402 is connected to one side of a lower end of an oiler 403; a propulsion slide base 404 is fixed to a bottom of the oiler 403, the propulsion slide base 404 is connected in a propulsion screw 405 in an adaptive manner, a front end of the propulsion screw 405 is rotatably connected to a front screw base 406, a rear end of the propulsion screw 405 is rotatably connected to a rear screw base 407, and the front screw base 406 and the rear screw base 407 are fixed on an inner wall of the oil filling chamber 218; an end shaft of the propulsion screw 405 is connected with a screw motor 408, and the screw motor 408 is fixed on the inner wall of the oil filling chamber 218; and an oiler slide base 410 is fixed on an outer wall of the oiler 403, an upper wall of an inner cavity of the oil filling chamber 218 is provided with an oiler slide position 409, and the oiler slide base 410 is slidably connected in the oiler slide position 409.

By starting the screw motor 408, the propulsion screw 405 is driven to rotate, and the propulsion screw 405 is engaged with the propulsion slide base 404 to drive the oiler 403 to move. The oiler slide base 410 located at the outer end of the oiler 403 slides in the oiler slide position 409, the movement of the oiler 403 drives the oil filling pipe 402 to move out of the oil filling pipe base 401, and finally the oil filling pipe 402 is moved out of the cleaning head 313, achieving a high level of automation.

A top of the oiler 403 is provided with an oil filling cover 411, a middle position of a top of the oil filling cover 411 is provided with an oil extrusion rack base 412, an oil extrusion rack 413 is slidably connected in the oil extrusion rack base 412, a piston column 416 is fixed at a lower end of the oil extrusion rack 413, and the piston column 416 is located in an inner cavity of the oiler 403; and one side of the oil extrusion rack 413 meshes with an oil extrusion gear 414, the oil extrusion gear 414 is connected with an oil extrusion motor 415 by a shaft, and the oil extrusion motor 415 is fixed on the upper end face of the oil filling cover 411.

By starting the oil extrusion motor 415, the oil extrusion gear 414 is driven to be engaged with the oil extrusion rack 413, and the oil extrusion rack 413 drives the piston column 416 to move downwards in the oiler 403, thus extruding the lubricating oil in the oiler 403. The lubricating oil is then applied to the outer surfaces of the transmission mechanisms in a hub in a wind turbine nacelle through the oil filling pipe 402, completing the maintenance work after cleaning.

Finally, it should be noted that the above embodiments are only used to illustrate the technical scheme of the invention, but not to limit it. Although the invention has been described in detail with reference to the foregoing embodiments, those of ordinary skill in the art should understand that the technical scheme described in the foregoing embodiments can still be modified, or some or all of the technical features can be equivalently replaced, and these modifications or substitutions do not make the essence of the corresponding technical scheme deviate from the scope of the technical scheme of each embodiment of the invention.

What is claimed is:

1. A device for cleaning and maintaining the interior of a hub in a wind turbine nacelle, comprising an integrated handgrip (101), and further comprising a handle component (1) and a switching assembly (2);
wherein the handle component (1) comprises a switching inner cavity (102) and a switching shaft block (103), and the switching assembly (2) comprises a switching body (201), a switching shaft (202), a switching center gear (203), a switching drive gear (204), a switching drive motor (205), a steam chamber (210), a contaminant collection chamber (217) and an oil filling chamber (218);
the integrated handgrip (101) in the handle component (1) is a main structural body of the cleaning and maintenance device, the switching inner cavity (102) runs through the integrated handgrip (101), the switching shaft block (103) is arranged at a middle position of an outer side wall of a main front of the integrated handgrip (101), and the switching shaft (202) is fixed at a middle position of an outer end face of the switching body (201) in the switching assembly (2); the switching shaft (202) is rotatably connected to the switching shaft block (103), and the switching body (201) is located in the switching inner cavity (102); the switching center gear (203) is fixedly inserted in a shaft end face of the switching shaft (202), and the switching drive gear (204) meshes with one side of the switching center gear (203); the switching drive gear (204) is connected with the switching drive motor (205) by a shaft, and the switching drive motor (205) is fixed on the outer side wall of the main front of the integrated handle (101);
the switching body (201) is divided into three chambers, namely the steam chamber (216), the contaminant collection chamber (217) and the oil filling chamber (218), and the three chambers are completely isolated;
the steam chamber (216) and the contaminant collection chamber (217) are provided with a combined cleaning assembly (3) for high-temperature steam cleaning and negative-pressure contaminant suction; and
a maintenance assembly (4) for oiling maintenance is arranged in the oil filling chamber (218).

2. The device for cleaning and maintaining the interior of a hub in a wind turbine nacelle according to claim 1, wherein an operation port (104) in the handle component (1) is formed at a front end of a main body of the integrated handgrip (101), a contaminant collection position (105) is arranged at a middle position of an outer side wall of a main rear of the integrated handgrip (101), and front and rear surfaces of a rear end of the integrated handgrip (101) are respectively provided with operation handles (106).

3. The device for cleaning and maintaining the interior of a hub in a wind turbine nacelle according to claim 1, wherein the switching assembly (2) further comprises a steam outlet (219) and a contaminant collection inlet (220), the steam outlet (219) is formed at a position, communicating with the steam chamber (216), of a front end of an outer wall of the switching body (201), and the contaminant collection inlet (220) is formed at a position, communicating with the contaminant collection chamber (217), of the front end of the outer wall of the switching body (201).

4. The device for cleaning and maintaining the interior of a hub in a wind turbine nacelle according to claim 1, wherein one end of a steam valve (301) in the combined cleaning assembly (3) for high-temperature steam cleaning and negative-pressure contaminant suction which is arranged in the steam chamber (216) and the contaminant collection chamber (217) is connected to a side, near the steam outlet (219), of an outer wall of a cavity of the switching body (201), the other end of the steam valve (301) is connected with an atomizer (302), the other end of the atomizer (302) is connected with a rapid heating pipe (303), the other end of the rapid heating pipe (303) is connected with a water tank (304), and a water tank cover (305) is installed at a top opening of the water tank (304); and a fan installation position (306) is further arranged on the outer wall of the cavity of the switching body (201), the fan installation position (306) is located behind the steam valve (301), a micro fan (307) is inserted in the fan installation position (306), and an air inlet filter element (308) is installed at an air inlet of the micro fan (307).

5. The device for cleaning and maintaining the interior of a hub in a wind turbine nacelle according to claim 4, wherein a steam cover (309) is fixed on an outer end face of the steam chamber (216), and the steam cover (309) is used for sealing the steam chamber (216); a contaminant collection cover (310) is fixed on an outer end face of the contaminant collection chamber (217), and the contaminant collection cover (310) is used for sealing the contaminant collection chamber (217); and a contaminant collection pump (311) is connected to a main surface of the contaminant collection cover (310), and the other end of the contaminant collection pump (311) is connected with a contaminant collection cylinder (312).

6. The device for cleaning and maintaining the interior of a hub in a wind turbine nacelle according to claim 1, wherein a cleaning head (313) is inserted in the operation port (104), a main body of the cleaning head (313) is of an elastic telescopic structure which can be stretched back and forth and can also be bent up and down, left and right, a fixed end of the cleaning head (313) communicates with both the steam outlet (219) and the contaminant collection inlet (220), and a front end of the cleaning head (313) is of a wide-mouth structure.

7. The device for cleaning and maintaining the interior of a hub in a wind turbine nacelle according to claim 1, wherein an oil filling pipe base (401) in the maintenance assembly (4) for oiling maintenance arranged in the oil filling chamber (218) is arranged on a front end face of the oil filling chamber (218), an oil filling pipe (402) is inserted into the oil filling pipe base (401), and a tail end of the oil filling pipe (402) is connected to one side of a lower end of an oiler (403); a propulsion slide base (404) is fixed to a bottom of the oiler (403), the propulsion slide base (404) is connected in a propulsion screw (405) in an adaptive manner, a front end of the propulsion screw (405) is rotatably connected to a front screw base (406), a rear end of the propulsion screw (405) is rotatably connected to a rear screw base (407), and the front screw base (406) and the rear screw base (407) are fixed on an inner wall of the oil filling chamber (218); an end shaft of the propulsion screw (405) is connected with a screw motor (408), and the screw motor (408) is fixed on the inner wall of the oil filling chamber (218); an oiler slide base (410) is fixed on an outer wall of the oiler (403), an upper wall of an inner cavity of the oil filling chamber (218) is provided with an oiler slide position (409), and the oiler slide base (410) is slidably connected in the oiler slide position (409); a top of the oiler (403) is provided with an oil filling cover (411), a middle position of a top of the oil filling cover (411) is provided with an oil extrusion rack base (412), an oil extrusion rack (413) is slidably connected in the oil extrusion rack base (412), a piston column (416) is fixed at a lower end of the oil extrusion rack (413), and the piston column (416) is located in an inner cavity of the oiler (403); and one side of the oil extrusion rack (413) meshes with an oil extrusion gear (414), the oil extrusion gear (414) is connected with an oil extrusion motor (415) by a shaft, and the oil extrusion motor (415) is fixed on the upper end face of the oil filling cover (411).

8. The device for cleaning and maintaining the interior of a hub in a wind turbine nacelle according to claim 1, wherein two ends of a bottom surface of a main body of the switching body (201) are respectively provided with auxiliary locking positions (206), and auxiliary ball positions (207) corresponding to the auxiliary locking positions (206) in position are arranged on the outer wall of the main front of the integrated handgrip (101); an auxiliary ball locking position (208) is fixed at a bottom end of the auxiliary ball position (207), a ball (209) is slidably connected in the auxiliary ball position (207), a compression spring base (211) is fixed at an upper end of the auxiliary ball position (207), and a compression spring (210) is elastically connected between the ball (209) and the compression spring base (211); a plurality of groups of gear locking positions (212) are 19 uniformly arranged on an outer main surface of the switching center gear (203) centered on the switching shaft (202); a gear locking position base (213) is fixed on the outer wall of the main front of the integrated handgrip (101), and a gear ball position (214) is arranged on a side, near the switching center gear (203), of the gear locking position base (213); a gear ball locking position (215) is fixed at a bottom end of the gear ball position (214); and another ball (209) is slidably connected in the gear ball position (214), another compression spring base (211) is fixed at an upper end of the gear ball position (214), and another compression spring (210) is elastically connected between the another ball (209) and the another compression spring base (211).

9. The device for cleaning and maintaining the interior of a hub in a wind turbine nacelle according to claim 8, wherein an inner diameter of the auxiliary ball locking position (208) is smaller than that of the auxiliary ball position (207), an inner diameter of the gear ball locking position (215) is smaller than that of the gear ball position (214), a main body of the ball (209) has the same dimension as the auxiliary ball locking position (208) and the gear ball locking position (215), and a rear base of the ball (209) has the same dimension as the auxiliary ball position (207) and the gear ball position (214).

\* \* \* \* \*